United States Patent
Raponi et al.

(10) Patent No.: US 10,298,485 B2
(45) Date of Patent: May 21, 2019

(54) SYSTEMS AND METHODS FOR NOC CONSTRUCTION

(71) Applicant: NetSpeed Systems, Inc., San Jose, CA (US)

(72) Inventors: Pier Giorgio Raponi, San Jose, CA (US); Sailesh Kumar, San Jose, CA (US); Nishant Rao, San Jose, CA (US)

(*) Notice: Subject to any disclaimer, the term of this patent is extended or adjusted under 35 U.S.C. 154(b) by 0 days.

(21) Appl. No.: 15/425,919

(22) Filed: Feb. 6, 2017

(65) Prior Publication Data

US 2018/0227215 A1    Aug. 9, 2018

(51) Int. Cl.
  *H04L 12/721*  (2013.01)
  *H04L 12/933*  (2013.01)
  *G06N 99/00*   (2019.01)
  *G06N 20/00*   (2019.01)

(52) U.S. Cl.
  CPC .............. *H04L 45/12* (2013.01); *H04L 45/38* (2013.01); *H04L 49/109* (2013.01); *G06N 20/00* (2019.01); *G06N 99/005* (2013.01)

(58) Field of Classification Search
  CPC ..... H04L 41/0893; H04L 45/02; H04L 45/00; H04L 45/12; H04L 47/2441
  See application file for complete search history.

(56) References Cited

U.S. PATENT DOCUMENTS

| 4,409,838 A | 10/1983 | Schomberg |
| 4,933,933 A | 6/1990 | Dally et al. |
| 5,105,424 A | 4/1992 | Flaig et al. |
| 5,163,016 A | 11/1992 | Har'El et al. |
| 5,355,455 A | 10/1994 | Hilgendorf et al. |
| 5,432,785 A | 7/1995 | Ahmed et al. |

(Continued)

FOREIGN PATENT DOCUMENTS

| CN | 103684961 A | 3/2014 |
| JP | 5936793 | 5/2016 |

(Continued)

OTHER PUBLICATIONS

Lin et al., Scalable Connection-Based Flow Control Scheme for Application-Specific Network-on-Chip, The Journa )f China Universities of Posts and Telecommunications, Dec. 2011,18(6), pp. 98-105.*

(Continued)

*Primary Examiner* — Romani Ohri
(74) *Attorney, Agent, or Firm* — Spectrum IP Law Group LLC

(57) ABSTRACT

Example implementations described herein are directed to systems and methods for generating a Network on Chip (NoC), which can involve determining a plurality of traffic flows from a NoC specification; grouping the plurality of traffic flows into a plurality of groups; utilizing a first machine learning algorithm to determine a sorting order on each of the plurality of groups of traffic flows; generating a list of traffic flows for NoC construction from the plurality of groups of traffic flows based on the sorting order; utilizing a second machine learning algorithm to select one or more mapping algorithms for each group of the plurality of groups of traffic flows for NoC construction; and generating the NoC based on a mapping from the selection of the one or more mapping algorithms.

12 Claims, 14 Drawing Sheets

(56) References Cited

U.S. PATENT DOCUMENTS

| | | |
|---|---|---|
| 5,563,003 A | 10/1996 | Suzuki et al. |
| 5,583,990 A | 12/1996 | Birrittella et al. |
| 5,588,152 A | 12/1996 | Dapp et al. |
| 5,764,740 A | 6/1998 | Holender |
| 5,790,554 A | 8/1998 | Pitcher |
| 5,859,981 A | 1/1999 | Levin et al. |
| 5,991,308 A | 11/1999 | Fuhrmann et al. |
| 5,999,530 A | 12/1999 | LeMaire |
| 6,003,029 A | 12/1999 | Agrawal et al. |
| 6,029,220 A | 2/2000 | Iwamura et al. |
| 6,058,385 A | 5/2000 | Koza et al. |
| 6,101,181 A | 8/2000 | Passint et al. |
| 6,108,739 A | 8/2000 | James et al. |
| 6,249,902 B1 | 6/2001 | Igusa et al. |
| 6,314,487 B1 | 11/2001 | Hahn et al. |
| 6,377,543 B1 | 4/2002 | Grover |
| 6,415,282 B1 | 7/2002 | Mukherjea et al. |
| 6,674,720 B1 | 1/2004 | Passint et al. |
| 6,701,361 B1 | 3/2004 | Meier |
| 6,711,717 B2 | 3/2004 | Nystrom et al. |
| 6,778,531 B1 | 8/2004 | Kodialam |
| 6,925,627 B1 | 8/2005 | Longway et al. |
| 6,967,926 B1 | 11/2005 | Williams, Jr. et al. |
| 6,983,461 B2 | 1/2006 | Hutchison et al. |
| 7,046,633 B2 | 5/2006 | Carvey |
| 7,065,730 B2 | 6/2006 | Alpert et al. |
| 7,143,221 B2 | 11/2006 | Bruce et al. |
| 7,318,214 B1 | 1/2008 | Prasad et al. |
| 7,379,424 B1 | 5/2008 | Krueger |
| 7,437,518 B2 | 10/2008 | Tsien |
| 7,461,236 B1 | 12/2008 | Wentzlaff |
| 7,509,619 B1 | 3/2009 | Miller et al. |
| 7,564,865 B2 | 7/2009 | Radulescu |
| 7,583,602 B2 | 9/2009 | Bejerano |
| 7,590,959 B2 | 9/2009 | Tanaka |
| 7,693,064 B2 | 4/2010 | Thubert et al. |
| 7,701,252 B1 | 4/2010 | Chow et al. |
| 7,724,735 B2 | 5/2010 | Locatelli et al. |
| 7,725,859 B1 | 5/2010 | Lenahan et al. |
| 7,774,783 B2 | 8/2010 | Toader |
| 7,808,968 B1 | 10/2010 | Kalmanek, Jr. et al. |
| 7,853,774 B1 | 12/2010 | Wentzlaff |
| 7,917,885 B2 | 3/2011 | Becker |
| 7,957,381 B2 | 6/2011 | Clermidy et al. |
| 7,973,804 B2 | 7/2011 | Mejdrich et al. |
| 8,018,249 B2 | 9/2011 | Koch et al. |
| 8,020,163 B2 | 9/2011 | Nollet et al. |
| 8,020,168 B2 | 9/2011 | Hoover et al. |
| 8,050,256 B1 | 11/2011 | Bao et al. |
| 8,059,551 B2 | 11/2011 | Milliken |
| 8,098,677 B1 | 1/2012 | Pleshek |
| 8,099,757 B2 | 1/2012 | Riedle et al. |
| 8,136,071 B2 | 3/2012 | Solomon |
| 8,203,938 B2 | 6/2012 | Gibbings |
| 8,261,025 B2 | 9/2012 | Mejdrich et al. |
| 8,281,297 B2 | 10/2012 | Dasu et al. |
| 8,306,042 B1 | 11/2012 | Abts |
| 8,312,402 B1 | 11/2012 | Okhmatovski et al. |
| 8,352,774 B2 | 1/2013 | Elrabaa |
| 8,407,425 B2 | 3/2013 | Gueron et al. |
| 8,412,795 B2 | 4/2013 | Mangano et al. |
| 8,438,578 B2 | 5/2013 | Hoover et al. |
| 8,448,102 B2 | 5/2013 | Kornachuk et al. |
| 8,490,110 B2 | 7/2013 | Hoover et al. |
| 8,492,886 B2 | 7/2013 | Or-Bach et al. |
| 8,503,445 B2 | 8/2013 | Lo |
| 8,514,889 B2 | 8/2013 | Jayasimha |
| 8,541,819 B1 | 9/2013 | Or-Bach et al. |
| 8,543,964 B2 | 9/2013 | Ge et al. |
| 8,572,353 B1 | 10/2013 | Bratt |
| 8,601,423 B1 | 12/2013 | Philip et al. |
| 8,614,955 B2 | 12/2013 | Gintis |
| 8,619,622 B2 | 12/2013 | Harrand et al. |
| 8,635,577 B2 | 1/2014 | Kazda et al. |
| 8,661,455 B2 | 2/2014 | Mejdrich et al. |
| 8,667,439 B1 | 3/2014 | Kumar et al. |
| 8,705,368 B1 | 4/2014 | Abts et al. |
| 8,711,867 B2 | 4/2014 | Guo et al. |
| 8,717,875 B2 | 5/2014 | Bejerano et al. |
| 8,726,295 B2 | 5/2014 | Hoover et al. |
| 8,738,860 B1 | 5/2014 | Griffin et al. |
| 8,793,644 B2 | 7/2014 | Michel et al. |
| 8,798,038 B2 | 8/2014 | Jayasimha et al. |
| 8,819,611 B2 | 8/2014 | Philip et al. |
| 8,885,510 B2 | 11/2014 | Kumar et al. |
| 9,210,048 B1 | 12/2015 | Marr |
| 9,223,711 B2 | 12/2015 | Philip et al. |
| 9,244,845 B2 | 1/2016 | Rowlands et al. |
| 9,244,880 B2 | 1/2016 | Philip et al. |
| 9,253,085 B2 | 2/2016 | Kumar et al. |
| 9,294,354 B2 | 3/2016 | Kumar |
| 9,319,232 B2 | 4/2016 | Kumar |
| 9,444,702 B1 | 9/2016 | Raponi et al. |
| 9,471,726 B2 | 10/2016 | Kumar et al. |
| 9,473,359 B2 | 10/2016 | Kumar et al. |
| 9,473,388 B2 | 10/2016 | Kumar et al. |
| 9,473,415 B2 | 10/2016 | Kumar |
| 9,477,280 B1 | 10/2016 | Gangwar et al. |
| 9,529,400 B1 | 12/2016 | Kumar et al. |
| 9,535,848 B2 | 1/2017 | Rowlands et al. |
| 9,568,970 B1 | 2/2017 | Kaushal et al. |
| 9,569,579 B1 | 2/2017 | Kumar |
| 9,571,341 B1 | 2/2017 | Kumar et al. |
| 9,571,402 B2 | 2/2017 | Kumar et al. |
| 9,571,420 B2 | 2/2017 | Kumar |
| 9,590,813 B1 | 3/2017 | Kumar et al. |
| 2002/0071392 A1 | 6/2002 | Grover et al. |
| 2002/0073380 A1 | 6/2002 | Cooke et al. |
| 2002/0083159 A1 | 6/2002 | Ward et al. |
| 2002/0095430 A1 | 7/2002 | Egilsson et al. |
| 2003/0088602 A1 | 5/2003 | Dutta et al. |
| 2003/0145314 A1 | 7/2003 | Nguyen et al. |
| 2004/0049565 A1 | 3/2004 | Keller et al. |
| 2004/0103218 A1 | 5/2004 | Blumrich et al. |
| 2004/0216072 A1 | 10/2004 | Alpert et al. |
| 2005/0147081 A1 | 7/2005 | Acharya et al. |
| 2005/0203988 A1 | 9/2005 | Nollet et al. |
| 2006/0002303 A1 | 1/2006 | Bejerano |
| 2006/0031615 A1 | 2/2006 | Bruce et al. |
| 2006/0075169 A1 | 4/2006 | Harris et al. |
| 2006/0161875 A1 | 7/2006 | Rhee |
| 2006/0206297 A1 | 9/2006 | Ishiyama et al. |
| 2006/0209846 A1 | 9/2006 | Clermidy et al. |
| 2006/0268909 A1 | 11/2006 | Langevin et al. |
| 2007/0038987 A1 | 2/2007 | Ohara et al. |
| 2007/0088537 A1 | 4/2007 | Lertora et al. |
| 2007/0118320 A1 | 5/2007 | Luo et al. |
| 2007/0147379 A1 | 6/2007 | Lee et al. |
| 2007/0162903 A1 | 7/2007 | Babb, II et al. |
| 2007/0244676 A1 | 10/2007 | Shang et al. |
| 2007/0256044 A1 | 11/2007 | Coryer et al. |
| 2007/0267680 A1 | 11/2007 | Uchino et al. |
| 2007/0274331 A1 | 11/2007 | Locatelli et al. |
| 2008/0072182 A1 | 3/2008 | He et al. |
| 2008/0120129 A1 | 5/2008 | Seubert et al. |
| 2008/0126569 A1 | 5/2008 | Rhim et al. |
| 2008/0184259 A1 | 7/2008 | Lesartre et al. |
| 2008/0186998 A1 | 8/2008 | Rijpkema |
| 2008/0211538 A1 | 9/2008 | Lajolo et al. |
| 2008/0232387 A1 | 9/2008 | Rijpkema et al. |
| 2009/0037888 A1 | 2/2009 | Tatsuoka et al. |
| 2009/0046727 A1 | 2/2009 | Towles |
| 2009/0070726 A1 | 3/2009 | Mehrotra et al. |
| 2009/0122703 A1 | 5/2009 | Gangwal et al. |
| 2009/0125574 A1 | 5/2009 | Mejdrich |
| 2009/0125706 A1 | 5/2009 | Hoover |
| 2009/0135739 A1 | 5/2009 | Hoover |
| 2009/0138567 A1 | 5/2009 | Hoover |
| 2009/0172304 A1 | 7/2009 | Gueron et al. |
| 2009/0187716 A1 | 7/2009 | Comparan et al. |
| 2009/0187756 A1 | 7/2009 | Nollet et al. |
| 2009/0210184 A1 | 8/2009 | Medardoni et al. |
| 2009/0231348 A1 | 9/2009 | Mejdrich et al. |
| 2009/0256836 A1 | 10/2009 | Fowler |

(56) References Cited

U.S. PATENT DOCUMENTS

| | | |
|---|---|---|
| 2009/0268677 A1 | 10/2009 | Chou et al. |
| 2009/0282222 A1 | 11/2009 | Hoover |
| 2009/0282227 A1 | 11/2009 | Hoover |
| 2009/0285222 A1 | 11/2009 | Hoover et al. |
| 2009/0300292 A1 | 12/2009 | Fang et al. |
| 2009/0307714 A1 | 12/2009 | Hoover et al. |
| 2009/0313592 A1 | 12/2009 | Murali et al. |
| 2010/0040162 A1 | 2/2010 | Suehiro |
| 2010/0158005 A1 | 6/2010 | Mukhopadhyay et al. |
| 2010/0211718 A1 | 8/2010 | Gratz et al. |
| 2010/0223505 A1 | 9/2010 | Andreev et al. |
| 2011/0022754 A1 | 1/2011 | Cidon et al. |
| 2011/0035523 A1 | 2/2011 | Feero et al. |
| 2011/0060831 A1 | 3/2011 | Ishii et al. |
| 2011/0072407 A1 | 3/2011 | Keinert et al. |
| 2011/0085550 A1 | 4/2011 | Lecler et al. |
| 2011/0085561 A1 | 4/2011 | Ahn |
| 2011/0103799 A1 | 5/2011 | Shacham et al. |
| 2011/0154282 A1 | 6/2011 | Chang et al. |
| 2011/0191774 A1 | 8/2011 | Hsu et al. |
| 2011/0235531 A1 | 9/2011 | Vangal et al. |
| 2011/0276937 A1 | 11/2011 | Waller |
| 2011/0302345 A1 | 12/2011 | Boucard et al. |
| 2011/0307734 A1 | 12/2011 | Boesen et al. |
| 2011/0320854 A1 | 12/2011 | Elrabaa |
| 2012/0022841 A1 | 1/2012 | Appleyard |
| 2012/0023473 A1 | 1/2012 | Brown et al. |
| 2012/0026917 A1 | 2/2012 | Guo et al. |
| 2012/0072635 A1 | 3/2012 | Yoshida |
| 2012/0079147 A1 | 3/2012 | Ishii et al. |
| 2012/0099475 A1 | 4/2012 | Tokuoka |
| 2012/0110106 A1 | 5/2012 | De Lescure et al. |
| 2012/0110541 A1 | 5/2012 | Ge et al. |
| 2012/0144065 A1 | 6/2012 | Parker |
| 2012/0155250 A1 | 6/2012 | Carney et al. |
| 2012/0173846 A1 | 7/2012 | Wang et al. |
| 2012/0195321 A1 | 8/2012 | Ramanujam |
| 2012/0209944 A1 | 8/2012 | Mejdrich et al. |
| 2012/0311512 A1 | 12/2012 | Michel |
| 2013/0028083 A1 | 1/2013 | Yoshida |
| 2013/0028090 A1 | 1/2013 | Yamaguchi et al. |
| 2013/0028261 A1 | 1/2013 | Lee |
| 2013/0051397 A1 | 2/2013 | Guo et al. |
| 2013/0054811 A1 | 2/2013 | Harrand |
| 2013/0073771 A1 | 3/2013 | Hanyu |
| 2013/0080073 A1 | 3/2013 | de Corral |
| 2013/0103369 A1 | 4/2013 | Huynh et al. |
| 2013/0103912 A1 | 4/2013 | Jones et al. |
| 2013/0117543 A1 | 5/2013 | Venkataramanan et al. |
| 2013/0148506 A1 | 6/2013 | Lea |
| 2013/0151215 A1 | 6/2013 | Mustapha |
| 2013/0159944 A1 | 6/2013 | Uno et al. |
| 2013/0163615 A1 | 6/2013 | Mangano et al. |
| 2013/0174113 A1 | 7/2013 | Lecler et al. |
| 2013/0179613 A1 | 7/2013 | Boucard et al. |
| 2013/0179902 A1 | 7/2013 | Hoover et al. |
| 2013/0191572 A1 | 7/2013 | Nooney et al. |
| 2013/0207801 A1 | 8/2013 | Barnes |
| 2013/0219148 A1 | 8/2013 | Chen et al. |
| 2013/0250792 A1 | 9/2013 | Yoshida et al. |
| 2013/0254488 A1 | 9/2013 | Kaxiras et al. |
| 2013/0263068 A1 | 10/2013 | Cho et al. |
| 2013/0268990 A1 | 10/2013 | Urzi et al. |
| 2013/0311819 A1 | 11/2013 | Ishii |
| 2013/0326458 A1 | 12/2013 | Kazda et al. |
| 2014/0068132 A1 | 3/2014 | Philip et al. |
| 2014/0068134 A1 | 3/2014 | Philip et al. |
| 2014/0082237 A1 | 3/2014 | Wertheimer |
| 2014/0092740 A1 | 4/2014 | Wang et al. |
| 2014/0092910 A1* | 4/2014 | Valentine ............. H04L 45/122 370/395.53 |
| 2014/0098683 A1 | 4/2014 | Kumar et al. |
| 2014/0112149 A1 | 4/2014 | Urzi et al. |
| 2014/0115218 A1 | 4/2014 | Philip et al. |
| 2014/0115298 A1 | 4/2014 | Philip et al. |
| 2014/0126572 A1 | 5/2014 | Hutton |
| 2014/0211622 A1 | 7/2014 | Kumar et al. |
| 2014/0254388 A1 | 9/2014 | Kumar et al. |
| 2015/0043575 A1 | 2/2015 | Kumar et al. |
| 2015/0103822 A1 | 4/2015 | Gianchandani |
| 2015/0109024 A1 | 4/2015 | Abdelfattah et al. |
| 2015/0159330 A1 | 6/2015 | Weisman et al. |
| 2015/0178435 A1 | 6/2015 | Kumar |
| 2015/0331831 A1 | 11/2015 | Solihin |
| 2017/0061053 A1 | 3/2017 | Kumar et al. |
| 2017/0063625 A1 | 3/2017 | Philip et al. |
| 2017/0063697 A1 | 3/2017 | Kumar |

FOREIGN PATENT DOCUMENTS

| | | |
|---|---|---|
| JP | 6060316 B2 | 1/2017 |
| JP | 6093867 B2 | 2/2017 |
| KR | 10-2013-0033898 A1 | 4/2013 |
| KR | 101652490 | 8/2016 |
| KR | 101707655 | 2/2017 |
| WO | 2010074872 A1 | 7/2010 |
| WO | 2013063484 A1 | 5/2013 |
| WO | 2014059024 A1 | 4/2014 |

OTHER PUBLICATIONS

Evgeny Bolotin, Israel Cidon, Ran Ginosar and Avinoam Kolodny, QoS architecture and design process for cost effective Network on Chip, Electrical Engineering Department, Technion—Israel Institute of Technology, 2004, p. 1-18 (Year: 2004).*

Ababei, C., et al., Achieving Network on Chip Fault Tolerance by Adaptive Remapping, Parallel & Distributed Processing, 2009, IEEE International Symposium, 4 pgs.

Abts, D., et al., Age-Based Packet Arbitration in Large-Radix k-ary n-cubes, Supercomputing 2007 (SC07), Nov. 10-16, 2007, 11 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Gindin, R., et al., NoC-Based FPGA: Architecture and Routing, Proceedings of the First International Symposium on Networks-on-Chip (NOCS'07), May 2007, pp. 253-262.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA 11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Hestness, J., et al., Netrace: Dependency-Tracking for Efficient Network-on-Chip Experimentation, The University of Texas at Austin, Dept. of Computer Science, May 2011, 20 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

(56) References Cited

OTHER PUBLICATIONS

Lin, S., et al., Scalable Connection-Based Flow Control Scheme for Application-Specific Network-on-Chip, The Journal of China Universities of Posts and Telecommunications, Dec. 2011, 18(6), pp. 98-105.
Bolotin, Evgency, et al., "QNoC: QoS Architecture and Design Process for Network on Chip" 2004, 24 pages, Journal of Systems Architecture 50 (2004) 105-128 Elsevier.
Holsmark, Shashi Kumar Rickard, et al., "HiRA: A Methodology for Deadlock Free Routing in Hierarchical Networks on Chip", 10 pages, (978-1-4244-4143-3/09 2009 IEEE).
Munirul, H.M., et al., Evaluation of Multiple-Valued Packet Multiplexing Scheme for Network-on-Chip Architecture, Proceedings of the 36th International Symposium on Multiple-Valued Logic (ISMVL '06), 2006, 6 pgs.
Rajesh BV, Shivaputra, "NoC: Design and Implementation of Hardware Network Interface With Improved Communication Reliability", 7 pages, International Journal of VLSI and Embedded Systems, IJIVES (vol. 04, Article 06116; Jun. 2013).
Yang, J., et al., Homogeneous NoC-based FPGA: The Foundation for Virtual FPGA, 10th IEEE International Conference on Computer and Information Technology (CIT 2010), Jun. 2010, pp. 62-67.
Zaman, Aanam, "Formal Verification of Circuit-Switched Network on Chip (NoC) Architectures using SPIN", Oosman Hasan, IEEE © 2014, 8 pages.
Benini, Luca, et al., "Networks on Chips: A New SoC Paradigm", IEEE Computers, SOC Designs, pp. 70-78, Copyright 2002 IEEE. 0018-9162/02.
Sethuraman, Ranga Vemuri Balasubramanian, "optiMap: A Tool for Automated Generation of NoC Architecture Using Multi-Port Routers for FPGAs", IEEE, pp. 1-6, 2006.
International Search Report and Written Opinion for PCT/US2014/060745, dated Jan. 21, 2015, 10 pgs.
International Search Report and Written Opinion for PCT/US2014/060879, dated Jan. 21, 2015, 10 pgs.
International Search Report and Written Opinion for PCT/US2014/060892, dated Jan. 27, 2015, 10 pgs.
International Search Report and Written Opinion for PCT/US2014/060886, dated Jan. 26, 2015, 10 pgs.
International Search Report and Written Opinion for PCT/US2013/064140, dated Jan. 22, 2014, 9 pgs.
International Search Report and Written Opinion for PCT/US2014/012003, dated Mar. 26, 2014, 9 pgs.
International Search Report and Written Opinion for PCT/US2014/012012, dated May 14, 2014, 9 pgs.
International Search Report and Written Opinion for PCT/US2014/023625, dated Jul. 10, 2014, 9 pgs.
International Preliminary Report on Patentability for International Application No. PCT/US2013/064140, dated Apr. 23, 2015, 6 pages.
Office Action for Korean Patent Application No. 10-2016-7019093 dated Sep. 8, 2016, 3 pages plus 1 page English translation. KIPO, Korea.
Notice of Allowance for for Korean Patent Application No. 10-2016-7019093 dated Dec. 5, 2016, 5 pages. KIPO, Korea.
International Search Report and Written Opinion for PCT/US2014/037902, dated Sep. 30, 2014, 14 pgs.
Office Action for Japanese Patent Application No. 2015-535898 dated Oct. 25, 2016, 2 pages English, 2 pages untranslated copy. Japan Patent Office.
Notice of Grant for Japanese Patent Application No. 2015-535898 dated Jan. 17, 2017, 3 pages, untranslated. Japan Patent Office.
International Search Report and Written Opinion for PCT/US2014/048190, dated Nov. 28, 2014, 11 pgs.
Office Action for Japanese Patent Application No. 2016-516030 dated Aug. 30, 2016, 2 pages, Japan Patent Office.
Decision to Grant for Japanese Patent Application No. 2016-516030 dated Nov. 22, 2016, 3 pages, untranslated, Japan Patent Office.

* cited by examiner

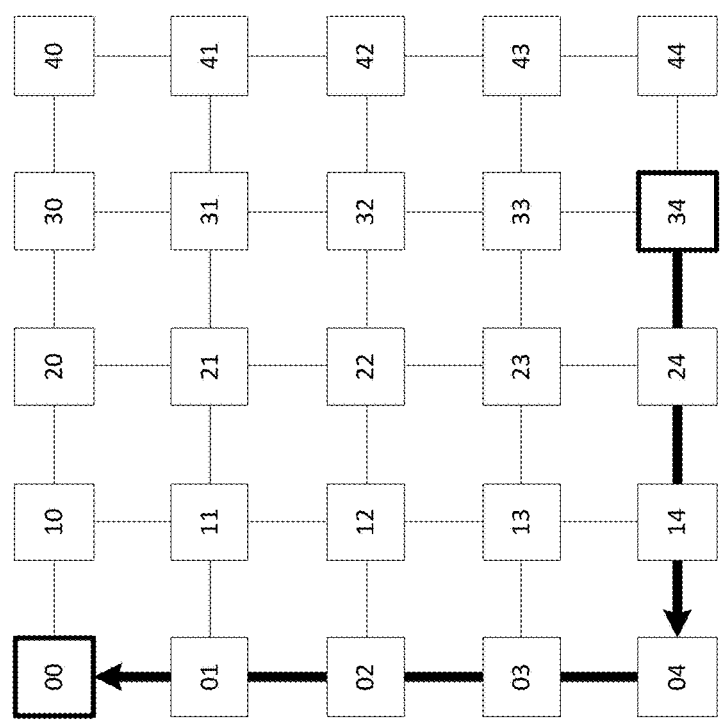

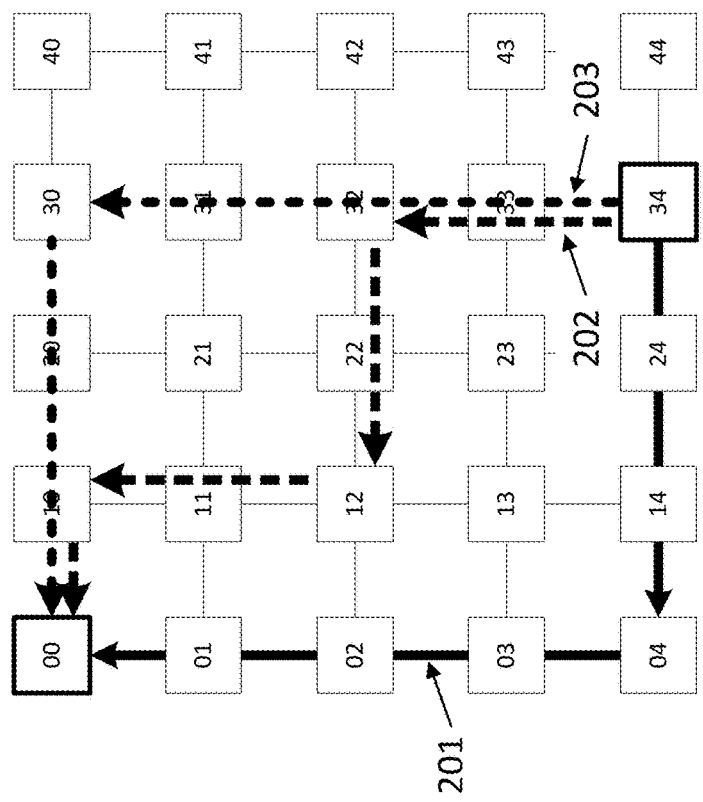

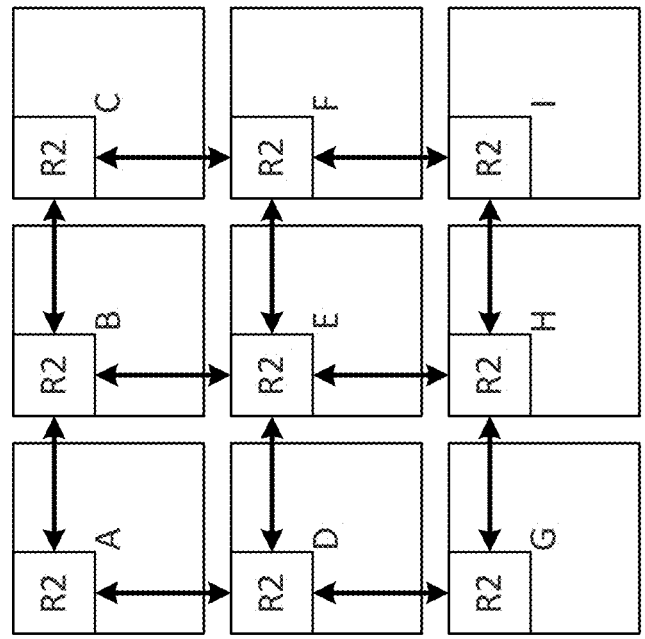
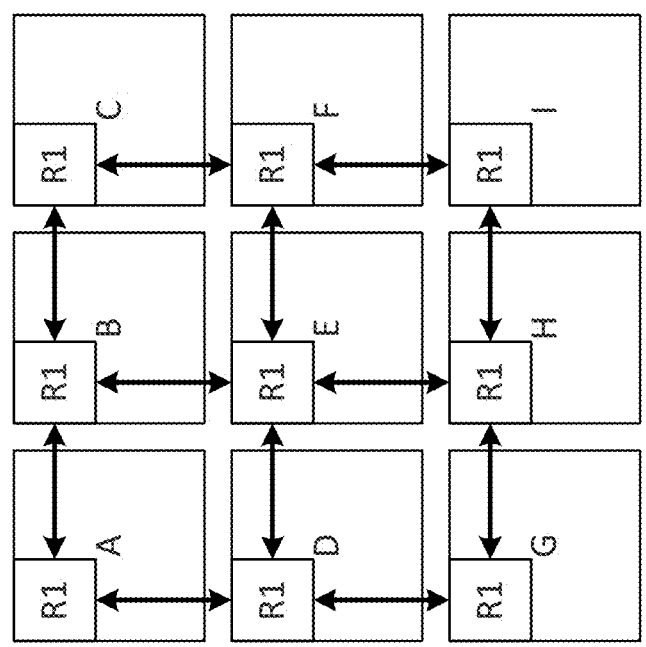
FIG. 3(a)

SYSTEMS AND METHODS FOR NOC CONSTRUCTION

BACKGROUND

Technical Field

Methods and example implementations described herein are directed to interconnect architecture, and more specifically, to systems and methods for constructing a Network on Chip (NoC).

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIGS. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Taurus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic slows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, then no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303, or bridge, may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements.

In a NoC interconnect, if the traffic profile is not uniform and there is a certain amount of heterogeneity (e.g., certain hosts talking to each other more frequently than the others), the interconnect performance may depend on the NoC topology and where various hosts are placed in the topology with respect to each other and to what routers they are connected to. For example, if two hosts talk to each other frequently and require higher bandwidth than other interconnects, then they should be placed next to each other. This will reduce the latency for this communication which thereby reduces the global average latency, as well as reduce the number of router nodes and links over which the higher bandwidth of this communication must be provisioned.

Moving two hosts closer together may make certain other hosts far apart since all hosts must fit into the 2D planar NoC topology without overlapping with each other. Thus, various tradeoffs must be made and the hosts must be placed after examining the pair-wise bandwidth and latency requirements between all hosts so that certain global cost and performance metrics is optimized. The cost and performance metrics can be, for example, average structural latency between all communicating hosts in number of router hops, or sum of bandwidth between all pair of hosts and the distance between them in number of hops, or some combination of these two. This optimization problem is known to be NP-hard and heuristic based approaches are often used. The hosts in a system may vary in shape and sizes with respect to each other, which puts additional complexity in placing them in a 2D planar NoC topology, packing them optimally while leaving little whitespaces, and avoiding overlapping hosts.

The optimization approaches introduced so far to determine the channel capacity, routes, host positions, etc., are useful when the exact traffic profile is known in advance at the NoC design time. If the precise traffic profile is not known at the design time, and the traffic profile changes during the NoC operation based on the SoC application's requirements, then the NoC design must allow these adjustments. For the NoC to allow these changes, the NoC must be designed so that it has knowledge of the changes that may occur in the traffic profile in a given system and ensure that any combination of allowable traffic profiles are supported by the NoC hardware architecture.

SUMMARY

Aspects of the present disclosure include a method for generating a Network on Chip (NoC), which can involve determining a plurality of traffic flows from a NoC specification; grouping the plurality of traffic flows into a plurality of groups; utilizing a first machine learning algorithm to determine a sorting order on each of the plurality of groups of traffic flows; generating a list of traffic flows for NoC construction from the plurality of groups of traffic flows based on the sorting order; utilizing a second machine learning algorithm to select one or more mapping algorithms for each group of the plurality of groups of traffic flows for NoC construction; and generating the NoC based on a mapping from the selection of the one or more mapping algorithms.

Aspects of the present disclosure further include a non-transitory computer readable medium, storing instructions for generating a Network on Chip (NoC). The instructions can include determining a plurality of traffic flows from a NoC specification; grouping the plurality of traffic flows into a plurality of groups; utilizing a first machine learning algorithm to determine a sorting order on each of the plurality of groups of traffic flows; generating a list of traffic flows for NoC construction from the plurality of groups of traffic flows based on the sorting order; utilizing a second machine learning algorithm to select one or more mapping algorithms for each group of the plurality of groups of traffic flows for NoC construction; and generating the NoC based on a mapping from the selection of the one or more mapping algorithms.

Aspects of the present disclosure include an apparatus configured to generate a Network on Chip (NoC). The apparatus can include a processor, configured to determine a plurality of traffic flows from a NoC specification; group the plurality of traffic flows into a plurality of groups; utilize a first machine learning algorithm to determine a sorting order on each of the plurality of groups of traffic flows; generate a list of traffic flows for NoC construction from the plurality of groups of traffic flows based on the sorting order; utilize a second machine learning algorithm to select one or more mapping algorithms for each group of the plurality of groups of traffic flows for NoC construction; and generate the NoC based on a mapping from the selection of the one or more mapping algorithms.

BRIEF DESCRIPTION OF THE DRAWINGS

FIG. 2(a) illustrates an example of XY routing in a related art two dimensional mesh.

FIG. 2(b) illustrates three different routes between a source and destination nodes.

FIG. 3(a) illustrates an example of a related art two layer NoC interconnect.

DETAILED DESCRIPTION

Figure 1A:
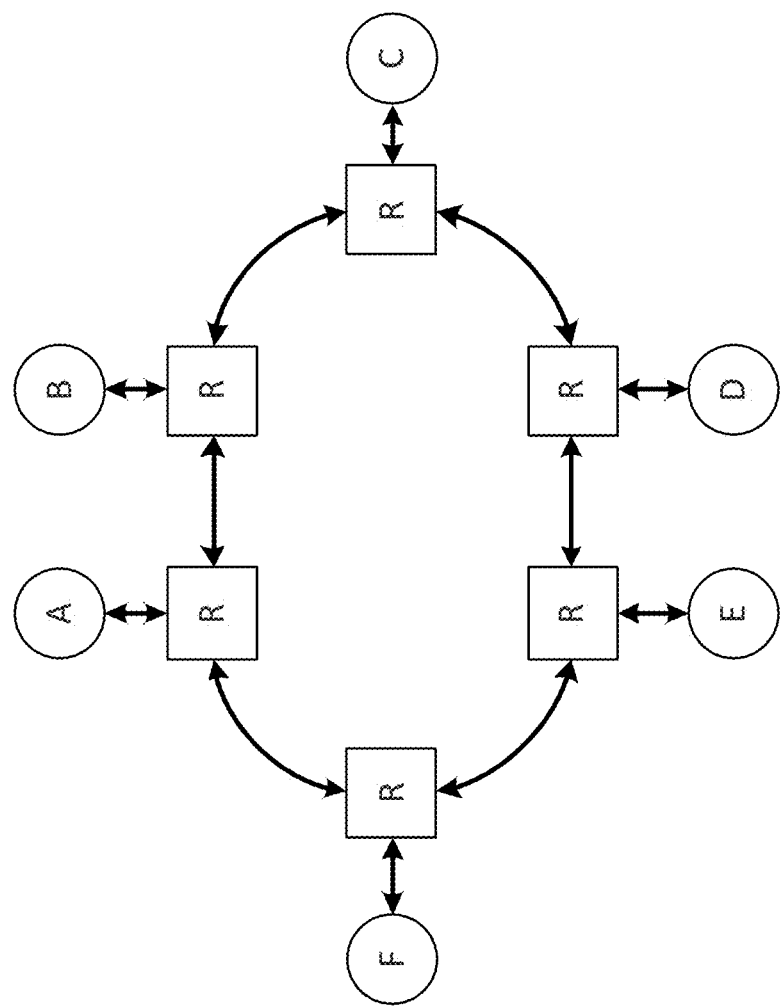
FIGS. 1(a), 1(b) 1(c) and 1(d) illustrate examples of Bidirectional ring, 2D Mesh, 2D Taurus, and 3D Mesh NoC Topologies.
Figure 1B:
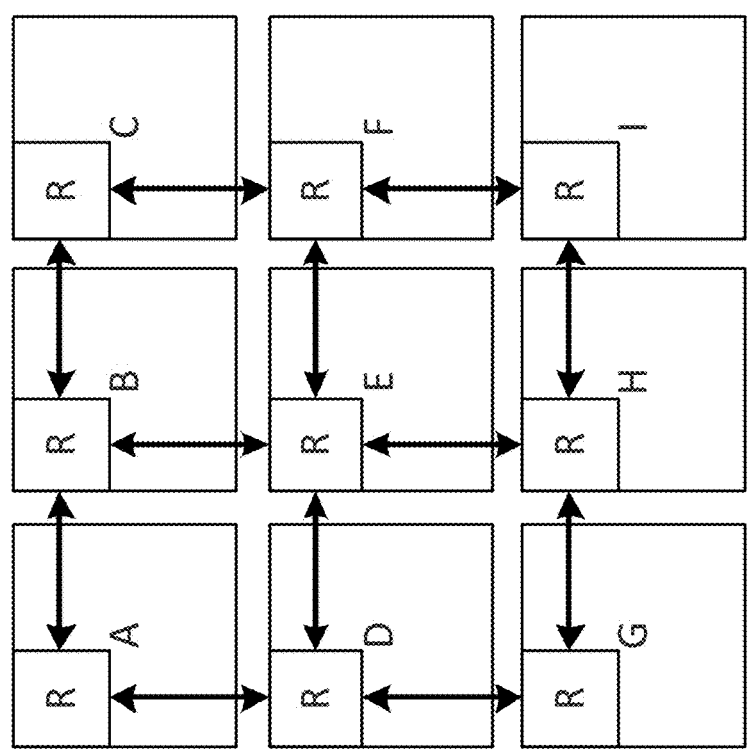
Figure 1C:
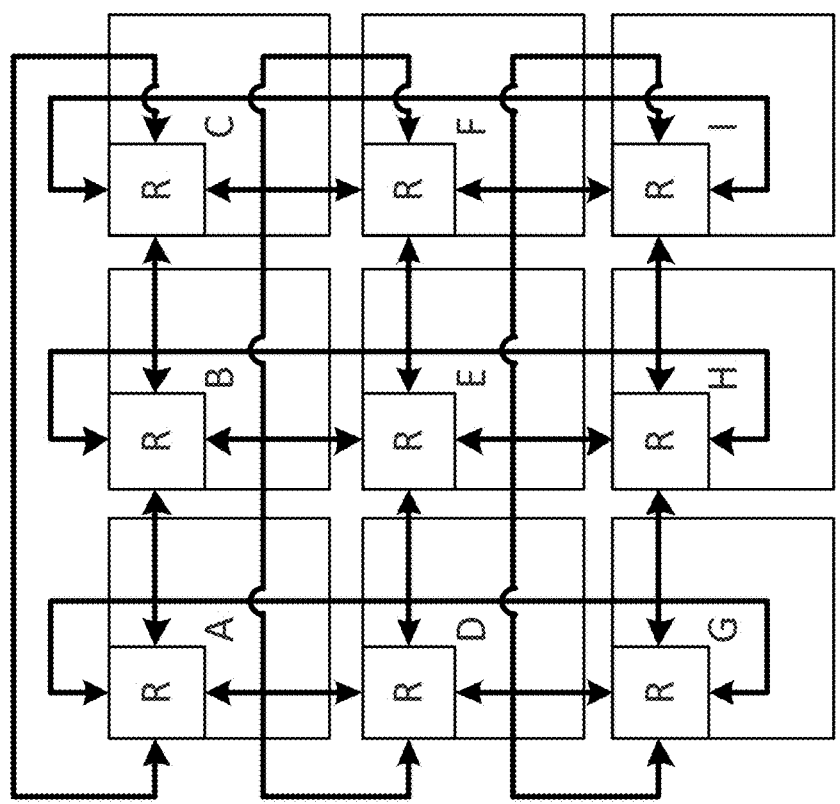
Figure 1D:
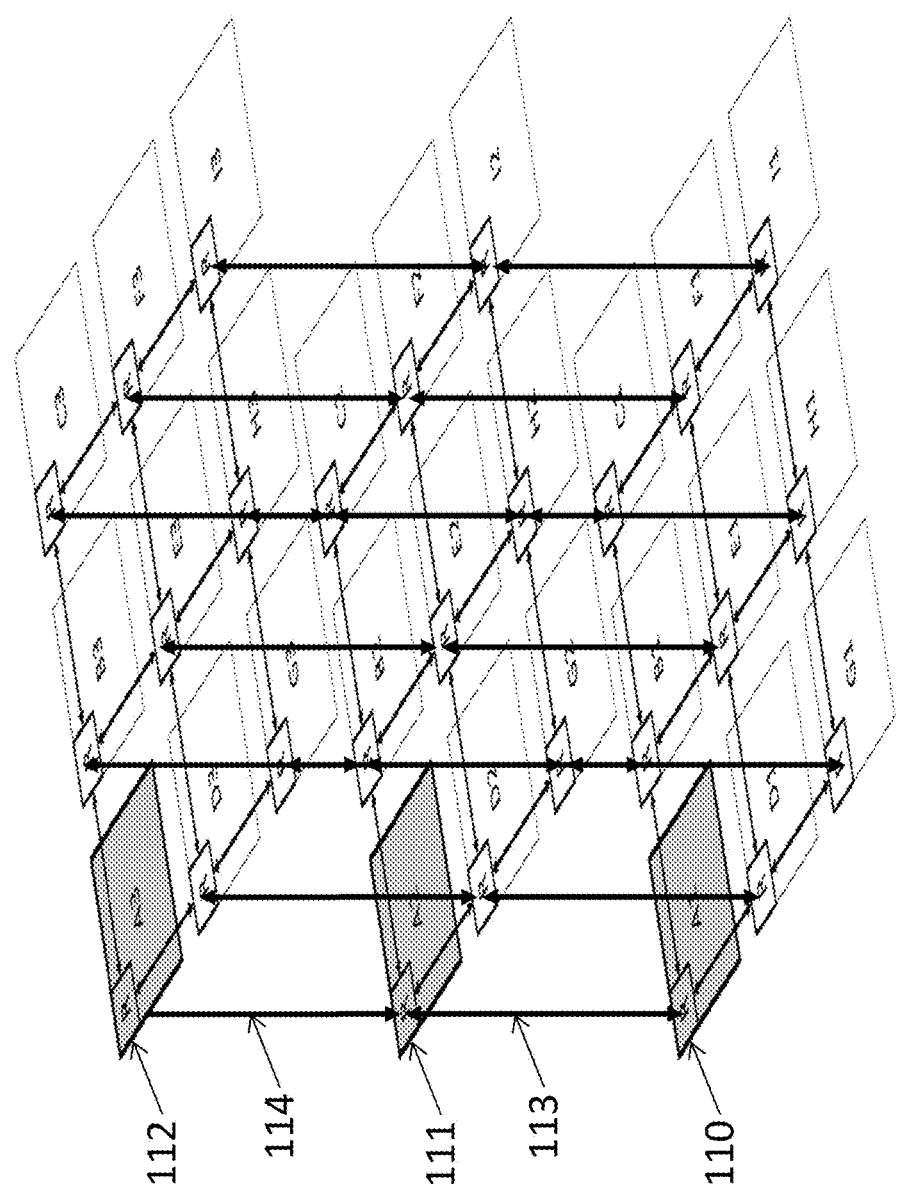
Figure 3B:
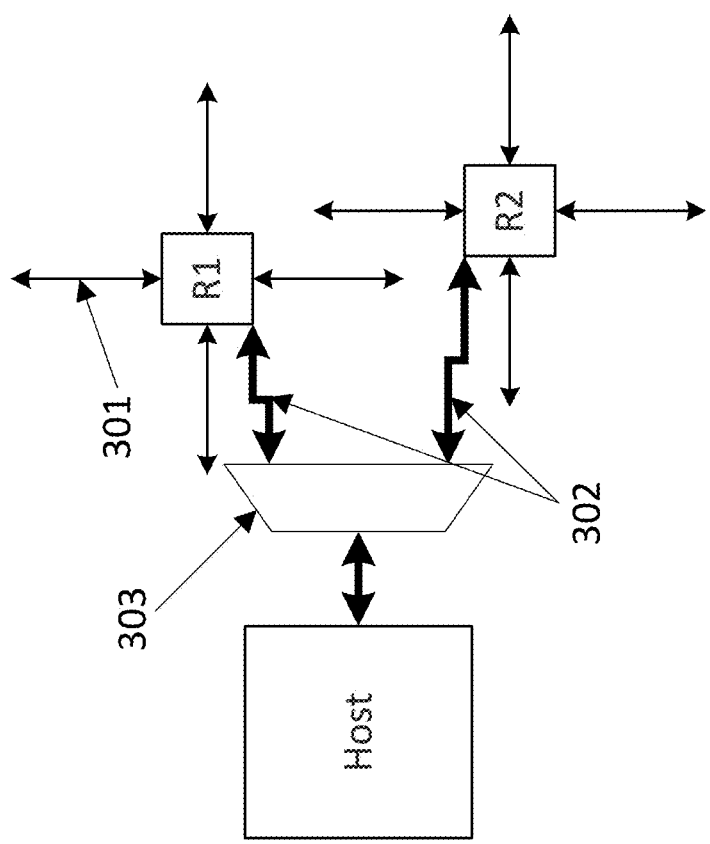
FIG. 3(b) illustrates the related art bridge logic between host and multiple NoC layers.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

In example implementations, a NoC interconnect is generated from a specification by utilizing design tools. The specification can contain constraints such as bandwidth/Quality of Service (QoS)/latency attributes that is to be met by the NoC, and can be in various software formats depending on the design tools utilized. Once the NoC is generated through the use of design tools on the specification to meet the specification requirements, the physical architecture can be implemented either by manufacturing a chip layout to facilitate the NoC or by generation of a register transfer level (RTL) for execution on a chip to emulate the generated NoC, depending on the desired implementation. Specifications may be in common power format (CPF), Unified Power Format (UPF), or others according to the desired specification. Specifications can be in the form of traffic specifications indicating the traffic, bandwidth requirements, latency requirements, interconnections and so on depending on the desired implementation. Specifications can also be in the form of power specifications to define power domains, voltage domains, clock domains, and so on, depending on the desired implementation.

A distributed NoC interconnect connects various components in a system on chip with each other using multiple routers and point to point links between the routers. The traffic profile of a SoC includes the transactions between various components in the SoC and their properties (e.g., Quality of Service (QoS), priority, bandwidth and latency requirements, transaction sizes, etc.). The traffic profile information may be used to determine how various transactions will be routed in the NoC topology, and accordingly provision the link capacities, virtual channels and router nodes of the NoC. Accurate knowledge of the traffic profile can lead to an optimized NoC hardware with minimal overprovisioning in terms of link wires, virtual channel buffers and additional router nodes. A variety of SoCs today are designed to run a number of different applications; the resulting NoC traffic profile therefore may differ based on how and in what market segments the SoC is deployed, and what applications are supported. Supporting a variety of traffic profiles offers several challenges in the NoC design and optimization. Even if multiple traffic profiles are supported functionally, the traffic profile observed in a particular setting may be different from the set of profiles for which the NoC is optimized, leading to sub-optimal power consumption and NoC performance.

Example implementations described herein are directed to solutions for 2-D, 2.5-D and 3-D NoC interconnects. The example implementations may involve various aspects, such as: 1) designing a NoC to one or more traffic profiles of a traffic specification by mapping their transactions to NoC and allocating routes, virtual channels, and layers; 2) supporting hardware reconfigurability in the NoC to be able to optimize the NoC performance for a given subset of traffic profiles present in a SoC; 3) using example implementations herein to process each flow to optimize the mapping of the flows to the NoC hardware; 5) based on the determined flows, generating the reconfiguration information to be loaded into the NoC hardware; and 6) finally transmitting the reconfiguration information to the NoC in a format that can be loaded into NoC reconfiguration hardware.

Figure 4:
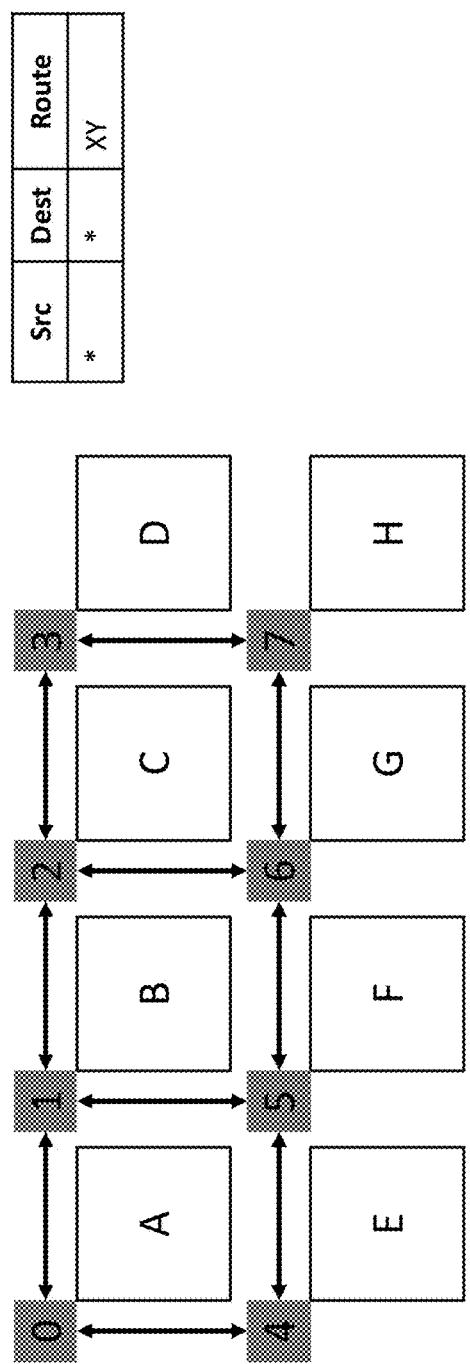
FIG. 4 illustrates a 4×2 mesh NoC mapping three traffic profiles using XY routing.

FIG. 4 illustrates an example of a traffic specification including multiple traffic profiles mapped to the NoC interconnect and mapping the transactions. Here there are three traffic profiles that need to be supported in a NoC interconnect connecting eight hosts, A, B, C, D, E, F, G, H. The inter-component communications of the three traffic profiles are as follows:

Traffic Profile 1: A<->B; A<->G;
Traffic Profile 2: A<->C; B<->D; D<->G; E<->F;
Traffic Profile 3: G<->C;

The example NoC of FIG. 4 is a 4×2 mesh topology. To support the three traffic profiles, routes and virtual channels are allocated for each transaction of all of the traffic profiles. In this case, a single NoC layer is allocated (for additional bandwidth and channels, more NoC layers may be allocated). A number of schemes can be used for allocation of NoC channels and routes and multiple layers, some of which are described in U.S. application Ser. Nos. 13/599,559, 13/745,684, and 13/752,226, hereby incorporated by reference for all purposes in their entirety. In this example, XY routes are used for all transactions, and the links and router nodes along the routes of all transactions in the three traffic profiles are allocated as shown in FIG. 4. Virtual channels allocated at various links between routers are omitted for clarity.

In related art implementations, one possible problem with the provided performance requirements is that, as such performance requirements may be provided by third parties or users, it may be uncertain as to whether a performance requirement is an absolute requirement or a desired requirement. In an example, a user incorporating a desired performance requirement in a NoC generation system may end up generating NoCs that have unacceptable costs, or lopsided costs when a significantly better NoC cost wise could have been generated in exchange for a slightly less restricted performance requirement. Thus, the generated NoCs may not meet the true requirements of the third parties or users.

Example implementations are directed to capturing input requirements and forming metrics that can be utilized to determine which of the possible generated NoCs can be further optimized. In example implementations, traffic flows are mapped, whereupon a NoC is selected and traffic flows are implemented with incremental refinement until the characteristics of the traffic flows are maximized.

Example implementations described herein are directed to determining strategies to be used to map and construct the NoC, and in particular, determining the order of flows. When strategies are selected, a list of flows that are available are provided, wherein each flow is picked individually in a certain order. The order of flows for implementing the strategy can be important in affecting the generation of the NoC.

In a first example implementation, there are systems and methods directed to the sorting of flows. In such an example implementation, the flows are ordered based on sorting mechanism that can be applied one or more times. Further, multiple different sorting algorithms can be applied depending on the desired implementation.

In example implementations, flows are grouped depending on the specification. Different characteristics of grouping can depend on the size of the NoC.

FIG. 5(*a*) illustrates a flow diagram for sorting flows and selecting mapping algorithms, in accordance with an example implementation. In example implementations of NoC construction, agents and traffic between the agents are provided from the NoC specifications, and the traffic flows needs to be mapped within the NoC. In example implementations, the available flows are listed and then mapped one by one according to a desired order. In example implementations, flow can be ordered based on a certain number of mechanisms or sorting/ordering that can be stacked on subsets within the same list of flows. Through such example implementations, a list of flows can be provided that is ordered sequentially through the use of multiple ordering methods (e.g. first ten flows are ordered using one ordering method, next ten are ordered using another).

At 500, a specification is processed for input dimensions, such as the number of bridges, the number of hosts, the placement, and so on.

At 501, the flows are grouped in accordance with the desired implementation. The example implementations may group the flows based on multicast, unicast, master/slave positioning, and so on depending on the desired implementation and the desired characteristic. In example implementations, any group can be formed in accordance with the desired characteristic and the present disclosure is not particularly limited to any group. In example implementations, the sorting or ordering of flows can be applied to any of the groups. Different characteristics can affect the aspects of the flow design.

Through grouping, example implementations facilitate the possibility to group flows together in accordance with desired characteristics, (e.g. all of the flows that have high bandwidth, multicast, so on). Groups can also be applied within other groups so that a fine grain sort within subsets can be implemented.

At 502, the flows are sorted in accordance with the desired implementation. For example, example sorting algorithms that can be applied to flows can include sorting from a high rate of traffic to a low rate of traffic, sorting based on the distance between the agents, based on the area consumption, based on the number of beats, and so on. Any sorting algorithm can be utilized for sorting the flows in accordance with the desired implementation. In example implementations, the sorting methods can be stacked (e.g., sorting within subsets of a sorted list based on another sorting strategy). For example, sorted flows can be divided and clustered into different groups, wherein additional sorting algorithms can be applied to each group. Depending on the desired implementation, the groups can be associated with a hierarchy, wherein different sorting algorithms are executed according to the hierarchy.

Figure 7:
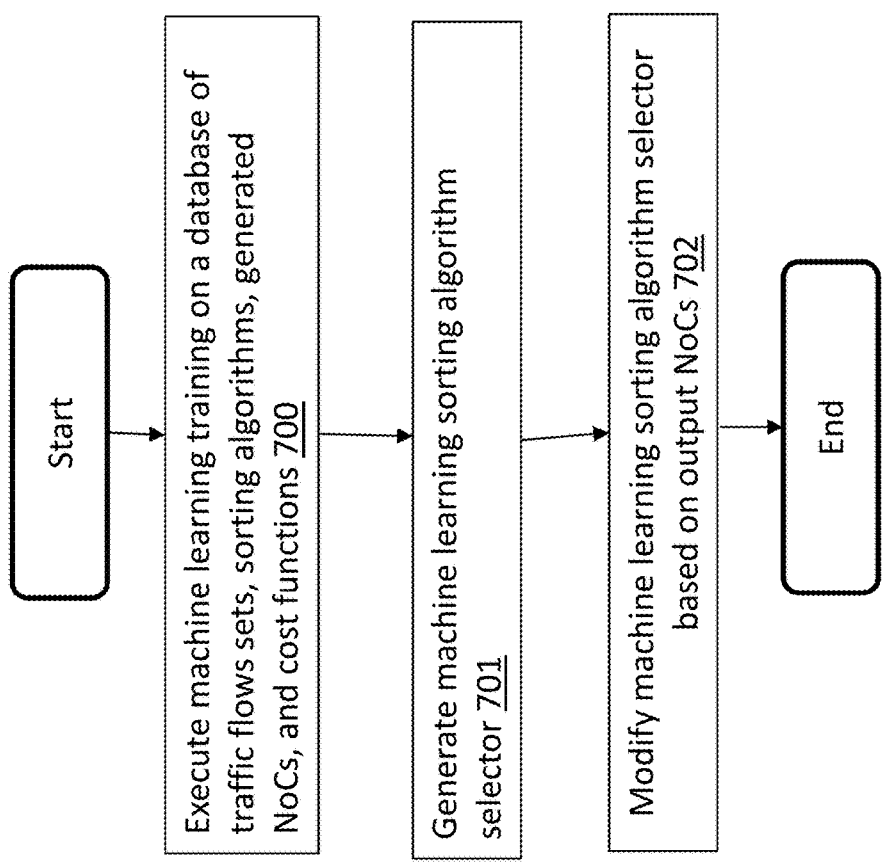
FIG. 7 illustrates an example flow for generating a machine learning sorting algorithm selector, in accordance with an example implementation.

In an example implementation, the sorting algorithms can be selected using a machine learning algorithm that is configured to select the sorting algorithms for each of the groups, as described in FIG. 7. The selected sorting algorithms are then executed on each of the groups of flows to determine a sorting order.

At 503, the output of all the executed sorting strategies is provided in the form of a list of flows. The list of flows is utilized by a mapping algorithm that maps the flows to the NoC.

At 504, a mapping algorithm is selected and executed on the list of flows. In example implementations, mapping algorithms are selected based on a machine learning process generated for the entire mapping space. The machine learning process selects a mapping algorithm based on the order of flows in view of a cost function. In example implementations, the mapping space can contain all of the mapping functions available for the implementation, such as, but not limited to, XY routing, YX routing, multiple routing based on source/destination, load balancing routing, turn based routing, separation of request/response traffic (e.g. forcing response traffic to avoid taking the same route as the request traffic), avoiding mixing with non-bandwidth intensive traffic, selecting separate path to avoid mixing traffic, and so on according to the desired implementation. Cost functions can include, but are not limited to, minimizing the number of links, buffer cost functions (VCs), link cost functions, and so on depending on the desired implementation. The machine learning can be trained against cost functions, generated NoCs and sets of flows, as described in FIG. 6.

In example implementations, characteristics of the NoC can be utilized to map a flow. For example, clock domain and power domain information can be utilized to map a flow (e.g. penalize costs for power domain crossing or clock domain crossing). Further, characteristics of the NoC can be modified to accommodate the mapped flow according to the desired implementation. For example, example implementations can adjust VCs of the NoC to facilitate store and forward functionality based on flows that require store and forward. Channels may be upsized and downsized depending on the desired implementation.

In example implementations, constraints can be utilized on the modification of the characteristics of the NoC during the flow mapping. For example, constraints can be placed regarding the number of channels that can be upsized or downsized in a NoC due to the costs incurred to performance on upsizing channels.

At 505, if desired, a remapping is conducted based on the generated NoC mapping. In example implementations, remapping can be executed when the number of congested flows exceeds a threshold, or based on other considerations in accordance with the desired implementation. In example implementations, the remapping can involve extracting already mapped flows from the NoC and changing the mapping to improve the cost of the NoC according to the desired cost function. In example implementations, flows can be mapped on a per flow basis, with the cost function reevaluated. For example, flows can be merged with other flows, or assigned a new route or new link based on an anticipated improvement to cost according to the cost function. Further, multiple cost functions, such as buffer cost, can also be utilized as a metric to discriminate between flows in accordance with the desired implementation.

At 506, the NoC is generated from the mapped flows and the placement of the agents.

Figure 5A:
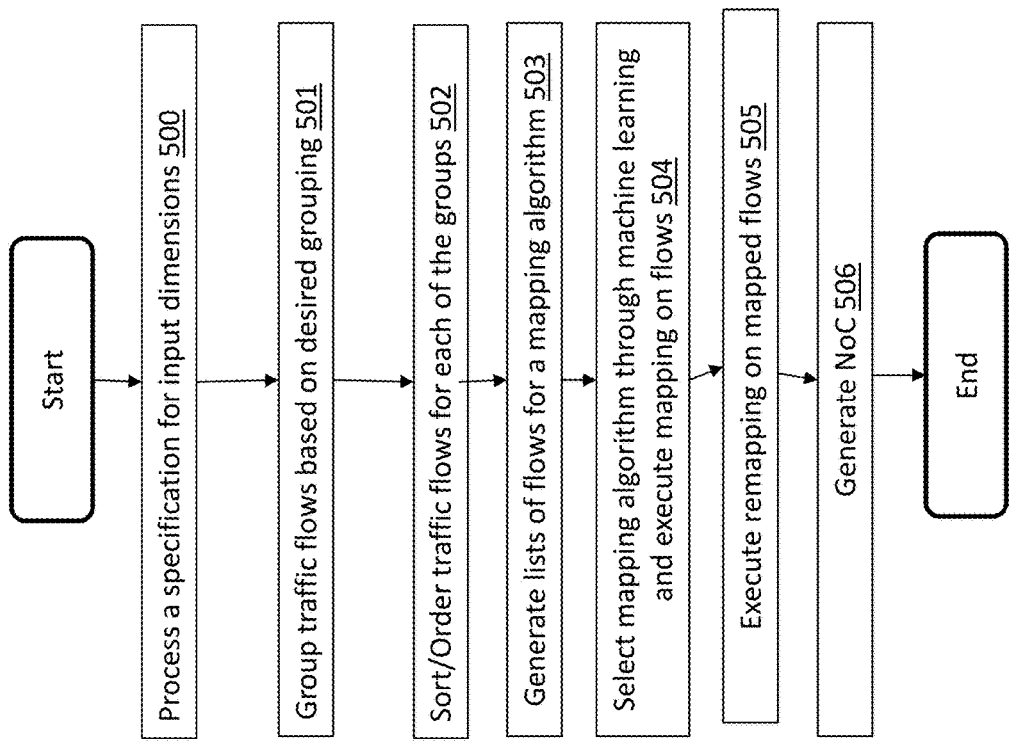
FIG. 5(a) illustrates a flow diagram for sorting flows and selecting mapping algorithms, in accordance with an example implementation.
Figure 5B:
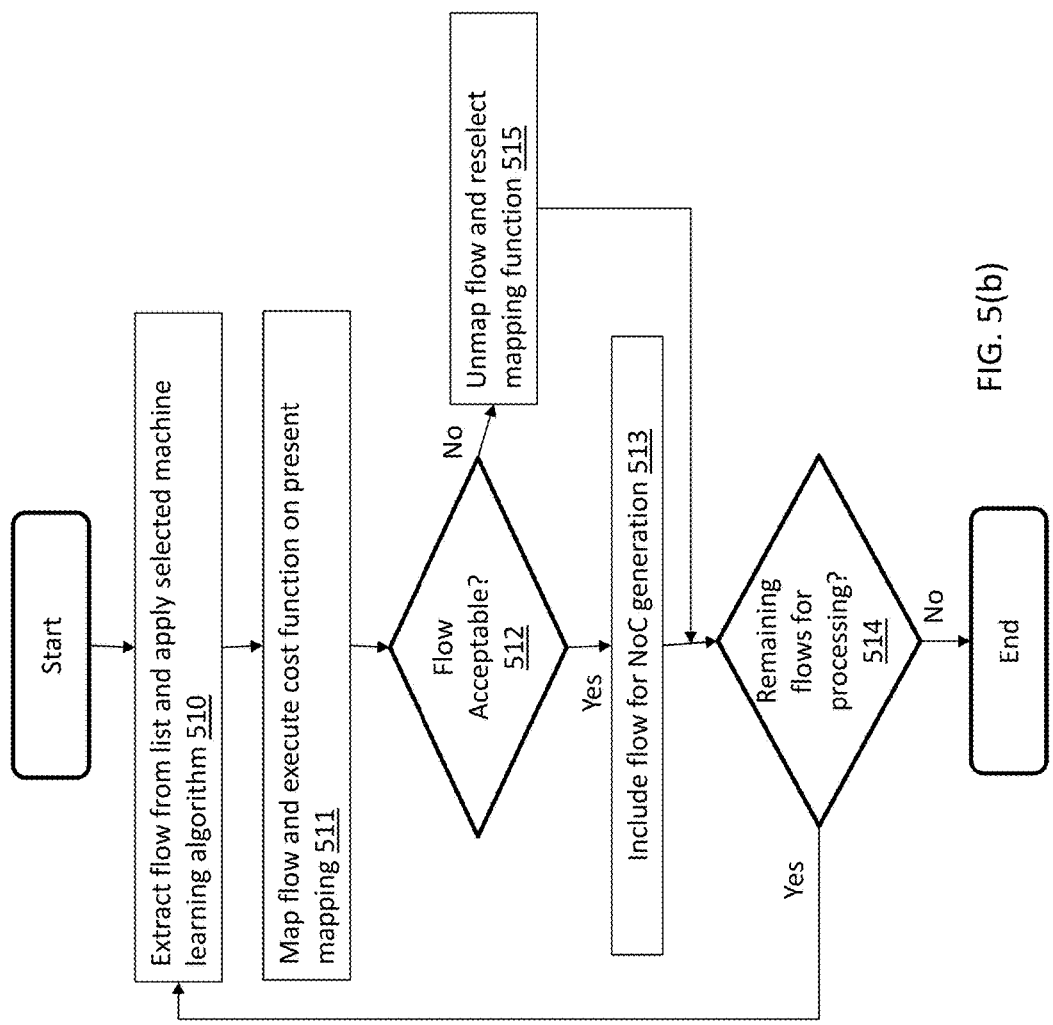
FIG. 5(b) illustrates a flow diagram for executing a mapping algorithm, in accordance with an example implementation.

FIG. 5(b) illustrates a flow diagram for executing a mapping algorithm, in accordance with an example implementation.

At 510, a flow is extracted from the list and the mapping algorithm selected by the machine learning algorithm is executed for the flow to map the flow to the NoC. At 511, the flow is mapped to the NoC and the cost function is executed on the mapped flows on the NoC. At 512, a determination is made as to whether the flow is acceptable or not. The determination can be made in accordance with the desired cost function and desired parameters. For example, if a flow is determined to increase the cost beyond a predetermined threshold, or if the mapped flow violates a desired NoC parameter or characteristic (No), then the flow can be unmapped and the mapping function can be reselected by the machine learning algorithm based on the present state of the NoC at 515. Otherwise (Yes), the flow is included for NoC generation at 513. At 514, if there are remaining flows left for processing (Yes), and then the next flow is extracted at 510.

Figure 6:
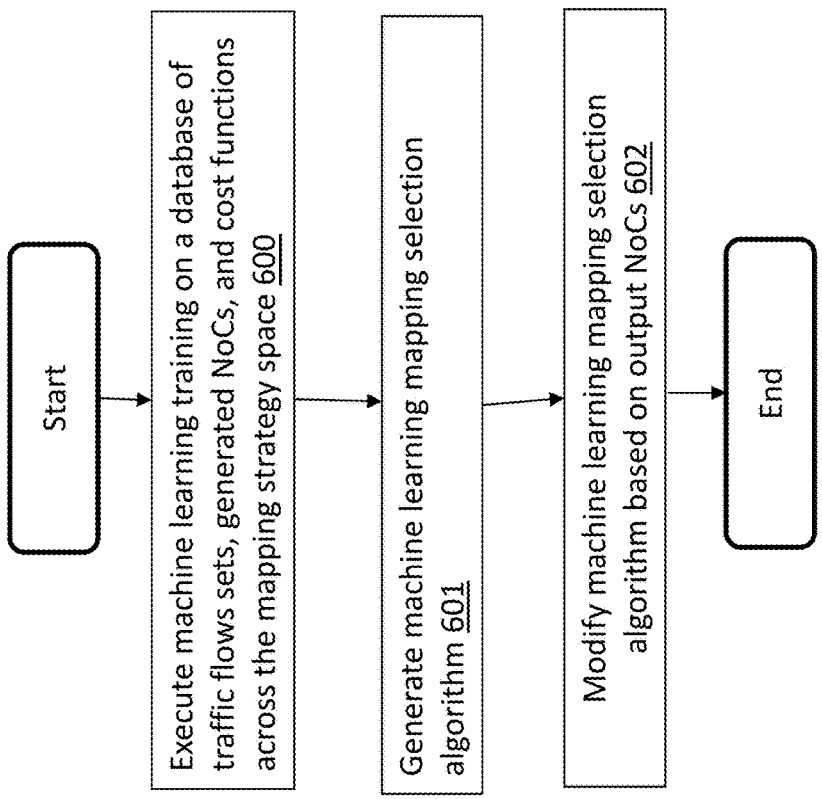
FIG. 6 illustrates an example flow for generating a machine learning mapping algorithm selector, in accordance with an example implementation.

FIG. 6 illustrates an example flow for generating a machine learning mapping algorithm selector, in accordance with an example implementation. At 600, machine learning training is executed on a database of traffic flows sets, generated NoCs, and cost functions across the mapping strategy space. In example implementations, classifiers can be used to generate a machine learning algorithm for a given cost function based on traffic flows sets, generated NoCs, the mapping strategy, and the value of the cost function to generate a selection function that selects a mapping strategy to minimize the cost based on the provided traffic flow sets and the generated NoCs. At 601, a machine learning mapping selection algorithm is generated from the training. At 602, the machine learning mapping selection algorithm can be trained further from NoC generation. For example, when the machine learning mapping selection algorithm is executed to select the mapping selection algorithm for a cost function, the determined cost can then be fed back into the machine learning mapping selection algorithm to train the selection algorithm further.

FIG. 7 illustrates an example flow for generating a machine learning sorting algorithm selector, in accordance with an example implementation. At 700, machine learning training is executed on a database of traffic flows sets, sorting algorithms, generated NoCs, and cost functions. In example implementations, classifiers can be used to generate a machine learning algorithm for a given cost function based on traffic flows sets, generated NoCs, the sorting algorithm, and the value of the cost function to generate a selection function that selects a sorting algorithm for each of the traffic flow sets to minimize the cost according to the cost function, based on the provided traffic flow sets and the generated NoCs. At 701, a machine learning sorting algorithm selector is generated from the training. At 702, the machine learning sorting algorithm selector can be trained further from NoC generation. For example, when the machine learning sorting algorithm selector is executed to select the sorting algorithm for given group of traffic flows based on a cost function, the determined cost can then be fed back into the machine learning sorting algorithm selector to train the selection algorithm further.

Figure 8:
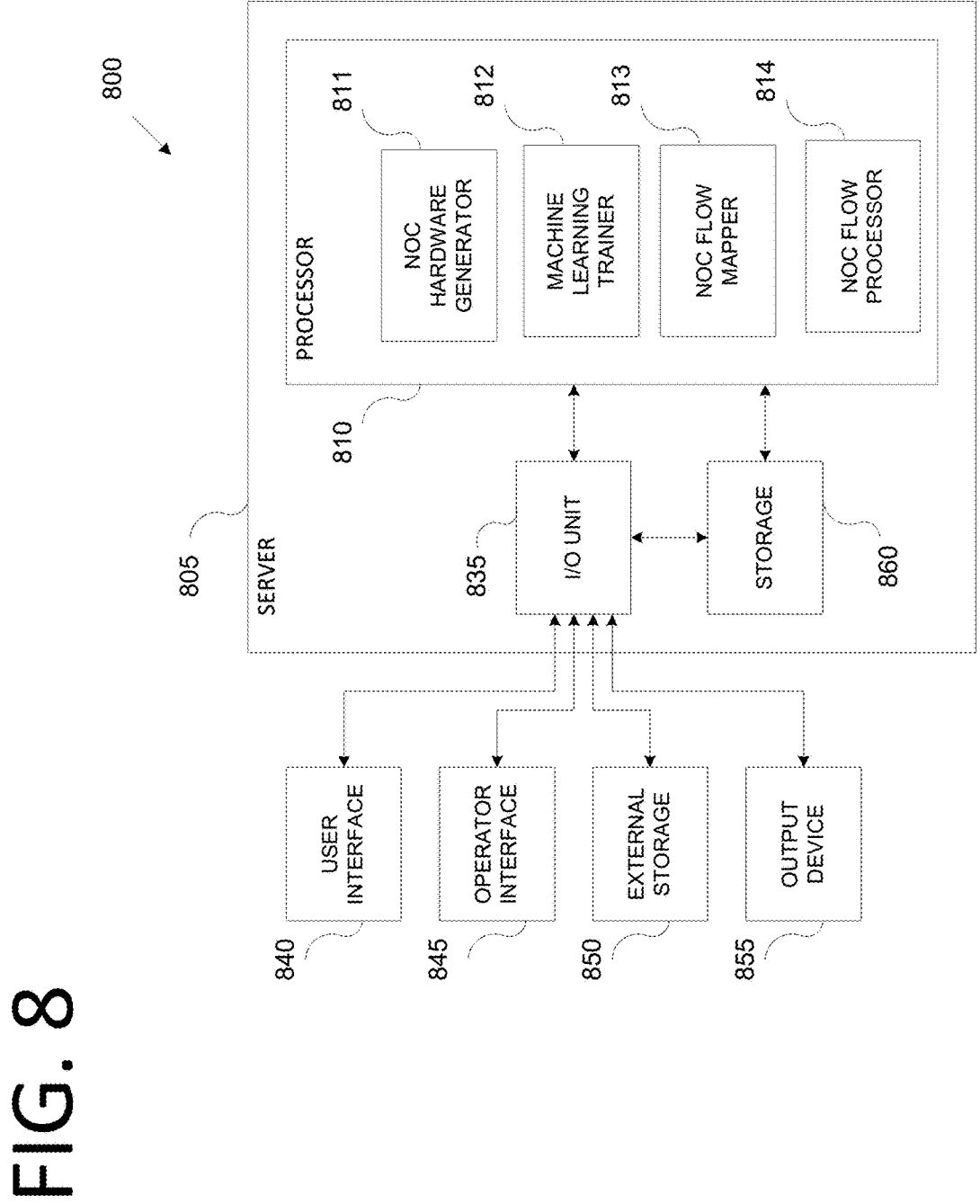
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules, such as the NoC hardware generator 811, the machine learning trainer 812, the NoC flow mapper 813, and the NoC flow processor 814. The execution of such modules can thereby effect the flow diagrams as illustrated in FIGS. 5(a), 5(b), 6 and 7.

The NoC flow processor 814 can be configured to determine a plurality of traffic flows from a NoC specification through utilization of any method in accordance with the desired implementation, and group the plurality of traffic flows into a plurality of groups. The grouping can be conducted based on any desired characteristics of the NoC (multicast flow, unicast flow, bandwidth above a set threshold, latency above a set threshold, etc.). Upon grouping of the flows, NoC flow processor 814 can be configured to utilize a machine learning algorithm to determine a sorting order on each of the plurality of groups of traffic flows, wherein the machine learning algorithm is generated by the machine learning trainer 812 in accordance with FIG. 6. Upon sorting of the groups, NoC flow processor 814 can thereby generate a list of traffic flows for NoC construction from the plurality of groups of traffic flows based on the sorting order.

The NoC flow mapper 813 can be configured to utilize a machine learning algorithm generated by machine learning trainer 812 to select one or more mapping functions for each group of the plurality of groups of traffic flows for NoC construction, and then map each flow individually on the list in accordance with FIG. 5(b) and the selected mapping function, as well as map each group from the list of traffic flows individually. The NoC flow mapper 813 can utilize a machine learning algorithm generated by the machine learning trainer 812 in accordance with the flow of FIG. 7, which is configured to select the mapping algorithms for each group of traffic flows of the plurality of groups of traffic flows based on the one or more cost functions applied to the NoC. Such cost functions can include area, number of physical links, bandwidth, latency, or any other characteristic and combination thereof, in accordance with the desired implementation.

The NoC hardware generator 811 is configured to generate the NoC based on the mapping of flows, which can be in the form of an RTL or a physical device configured to behave as the mapped NoC.

In accordance with FIG. 5(b), the NoC flow mapper 813 can be configured to select the one or more mapping algorithms by selecting a first mapping algorithm from the one or more mapping algorithms based on the machine learning algorithm for a cost function; executing the first mapping algorithm to map a first flow from the list of traffic flow groups; for subsequent mapping of traffic flow groups from the list of traffic flow groups by the first mapping algorithm not meeting the cost function, selecting a second mapping algorithm from the one or more mapping algorithms based on the machine learning algorithm, the cost function, and a current mapping status of the NoC.

In accordance with FIG. 5(a), the NoC flow mapper 813 can also be configured to select one or more traffic flow groups from the generated NoC for remapping based on a cost function applied to the NoC.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method for generating a Network on Chip (NoC), comprising:
   determining a plurality of traffic flows from a NoC specification;
   grouping the plurality of traffic flows into a plurality of groups based on characteristics of the NoC;
      utilizing a first machine learning algorithm to determine a sorting order on each of the plurality of groups of traffic flows, the first machine learning algorithm configured to determine the sorting order according to one or more first cost functions;
      generating a list of traffic flows for NoC construction from the plurality of groups of traffic flows based on the sorting order;
      utilizing a second machine learning algorithm to select one or more mapping algorithms for each group of the plurality of groups of traffic flows for NoC construction; and generating the NoC based on a mapping from the selection of the one or more mapping algorithms,
wherein the second machine learning algorithm is configured to select the one or more mapping algorithms by:
selecting a first mapping algorithm from the one or more mapping algorithms based on the second machine learning algorithm for one or more second cost functions;
executing the first mapping algorithm to map a first flow from the list of traffic flow groups;
for subsequent mapping of traffic flow groups from the list of traffic flow groups by the first mapping algorithm not meeting the one or more second cost functions, selecting a second mapping algorithm from the one or more mapping algorithms based on the second machine learning algorithm, the one or more second cost functions, and a current mapping status of the NoC.

2. The method of claim 1, wherein the one or more mapping algorithms are configured to map each group of traffic flows of the plurality of groups of traffic flows individually.

3. The method of claim 1, wherein the second machine learning algorithm is configured to select the one or more mapping algorithms for each group of traffic flows of the plurality of groups of traffic flows based on one or more second cost functions.

4. The method of claim 1, further comprising:
selecting one or more traffic flow groups from the generated NoC for remapping based on a third cost function.

5. A non-transitory computer readable medium, storing instructions for generating a Network on Chip (NoC), the instructions comprising:
determining a plurality of traffic flows from a NoC specification;
grouping the plurality of traffic flows into a plurality of groups based on characteristics of the NoC;
utilizing a first machine learning algorithm to determine a sorting order on each of the plurality of groups of traffic flows, the first machine learning algorithm configured to determine the sorting order according to one or more first cost functions;
generating a list of traffic flows for NoC construction from the plurality of groups of traffic flows based on the sorting order;
utilizing a second machine learning algorithm to select one or more mapping algorithms for each group of the plurality of groups of traffic flows for NoC construction; and
generating the NoC based on a mapping from the selection of the one or more mapping algorithms,
wherein the second machine learning algorithm is configured to select the one or more mapping algorithms by:
selecting a first mapping algorithm from the one or more mapping algorithms based on the second machine learning algorithm for one or more second cost functions;
executing the first mapping algorithm to map a first flow from the list of traffic flow groups;
for subsequent mapping of traffic flow groups from the list of traffic flow groups by the first mapping algorithm not meeting the one or more second cost functions, selecting a second mapping algorithm from the one or more mapping algorithms based on the second machine learning algorithm, the one or more second cost functions, and a current mapping status of the NoC.

6. The non-transitory computer readable medium of claim 5, wherein the one or more mapping algorithms are configured to map each group of traffic flows of the plurality of groups of traffic flows individually.

7. The non-transitory computer readable medium of claim 5, wherein the second machine learning algorithm is configured to select the one or more mapping algorithms for each group of traffic flows of the plurality of groups of traffic flows based on one or more second cost functions.

8. The non-transitory computer readable medium of claim 5, further comprising:
selecting one or more traffic flow groups from the generated NoC for remapping based on a third cost function.

9. An apparatus configured to generate a Network on Chip (NoC), the apparatus comprising:
a processor, configured to:
determine a plurality of traffic flows from a NoC specification;
group the plurality of traffic flows into a plurality of groups based on characteristics of the NoC;
utilize a first machine learning algorithm to determine a sorting order on each of the plurality of groups of traffic flows, the first machine learning algorithm configured to determine the sorting order according to a first cost function;
generate a list of traffic flows for NoC construction from the plurality of groups of traffic flows based on the sorting order;
utilize a second machine learning algorithm to select one or more mapping algorithms for each group of the plurality of groups of traffic flows for NoC construction; and
generate the NoC based on a mapping from the selection of the one or more mapping algorithms,
wherein the second machine learning algorithm is configured to select the one or more mapping algorithms by:
selecting a first mapping algorithm from the one or more mapping algorithms based on the second machine learning algorithm for one or more second cost functions;
executing the first mapping algorithm to map a first flow from the list of traffic flow groups;
for subsequent mapping of traffic flow groups from the list of traffic flow groups by the first mapping algorithm not meeting the one or more second cost functions, selecting a second mapping algorithm from the one or more mapping algorithms based on the second machine learning algorithm, the one or more second cost functions, and a current mapping status of the NoC.

10. The apparatus of claim 9, wherein the one or more mapping algorithms are configured to map each group of traffic flows of the plurality of groups of traffic flows individually.

11. The apparatus of claim 9, wherein the second machine learning algorithm is configured to select the one or more mapping algorithms for each group of traffic flows of the plurality of groups of traffic flows based on one or more second cost functions.

12. The apparatus of claim 9, wherein the processor is further configured to:

select one or more traffic flow groups from the generated
NoC for remapping based on a third cost function.

\* \* \* \* \*